(12) United States Patent
Su et al.

(10) Patent No.: US 6,741,813 B2
(45) Date of Patent: May 25, 2004

(54) INTERFERENCE-BASED DWDM OPTICAL INTERLEAVER USING BEAM SPLITTING AND SELECTIVE PHASE SHIFTING AND RE-COMBINING

(75) Inventors: Zhenpeng Su, Fremont, CA (US); Yi Qin, Pleasanton, CA (US); Hongchuan Wang, Fremont, CA (US); Zhouzheng Shi, Union City, CA (US)

(73) Assignee: Nexfon Corporation, Fremont, CA (US)

( * ) Notice: Subject to any disclaimer, the term of this patent is extended or adjusted under 35 U.S.C. 154(b) by 519 days.

(21) Appl. No.: 09/742,749

(22) Filed: Dec. 20, 2000

(65) Prior Publication Data

US 2003/0099013 A1 May 29, 2003

Related U.S. Application Data

(63) Continuation-in-part of application No. 09/573,330, filed on May 18, 2000.

(51) Int. Cl.[7] .............................. H04J 14/02; G02B 5/30
(52) U.S. Cl. ........................ 398/79; 398/86; 359/496; 359/497
(58) Field of Search ........................ 398/79, 82, 86–87; 359/494–497, 498, 618

(56) References Cited

U.S. PATENT DOCUMENTS 6,208,444 B1 * 3/2001 Wong et al. .................... 398/9
6,212,313 B1 * 4/2001 Li .................................. 385/24
6,301,046 B1 * 10/2001 Tai et al. ..................... 359/498
6,400,508 B1 * 6/2002 Liu .............................. 359/495
6,570,711 B2 * 5/2003 Ducellier .................... 359/629
6,574,049 B1 * 6/2003 Qian et al. .................. 359/634

\* cited by examiner

*Primary Examiner*—Kinfe-Michael Negash
(74) *Attorney, Agent, or Firm*—Leonard Tachner (57) ABSTRACT

An interleaver comprises a serial array of optical elements to which a multichannel, continuous spectrum, composite signal is input and two multichannel, non-continuous spectrum, composite signals are output. Two embodiments are disclosed. One such embodiment provides output composite signals which are spectrally symmetric in that each such non-continuous spectrum contains the same number of channels albeit of alternating center wavelengths. The other such embodiment provides output composite signals which are spectrally asymmetric in that each such non-continuous spectrum contains either a different number of channels or an equal number of channels of narrower or wider passband. Each of the preferred embodiments comprises an array of optical elements which split the input composite signal into components of different polarization states, selectively add phase shifts to some of these components and recombine them a number of times. The inventive arrays operate on the incident composite signal light beam to produce interference effects which attenuate the unwanted wavelength components in each composite output signal and reinforce the desired wavelength components.

3 Claims, 12 Drawing Sheets

INTERFERENCE-BASED DWDM OPTICAL INTERLEAVER USING BEAM SPLITTING AND SELECTIVE PHASE SHIFTING AND RE-COMBINING

CROSS REFERENCE TO RELATED APPLICATIONS

This application is a continuation-in-part of pending application Ser. No. 09/573,330 filed May 18, 2000.

BACKGROUND OF THE INVENTION

1. Field of the Invention

The present invention relates generally to the field of optical communications and more particularly to an interference-based method and apparatus for wavelength slicing for use in dense wavelength division multiplexing (DWDM) applications.

2. Background Art

Optical communications is an active area of new technology and is crucial to the development and progress of several important technologies, e.g., Internet and related new technologies. A key technology that enables higher data transmission rate is the dense wavelength division multiplexing (DWDM) technology. In the DWDM technology, optical signals generated from different sources operating at predetermined, dense-spaced center wavelengths are first combined to form a single optical output. This single optical output is then transmitted, frequently amplified during transmission, through an optical fiber. The single optical output is then de-multiplexed, a process to separate individual data channels and each channel is then directed to its own destinations. In the DWDM technology, each data channel is assigned to a center frequency and the spacing between any two adjacent channels is a constant (e.g., 200 GHz or 100 GHz). It is also understood that all channels are given frequency windows with identical width. The width of these windows is kept great enough to pass information associated with these data channels and at the same time as narrow as possible to prevent cross-talking between different data channels. It is generally understood that the narrower the frequency spacing between different data channels, the greater the transmission capacity a DWDM system will have.

Figure 1A:
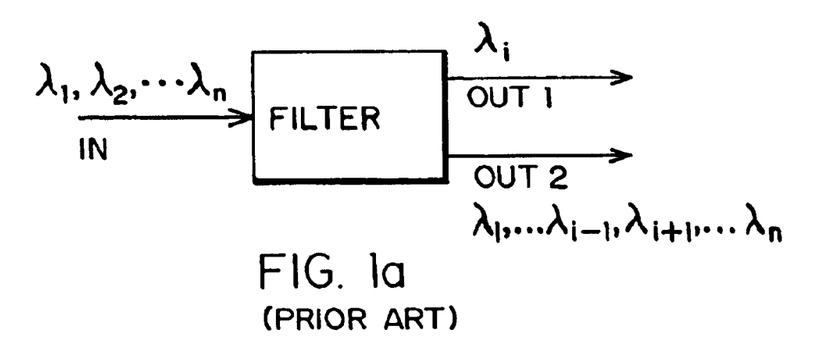
FIG. 1A is a block diagram illustrating the operation of a generic filter device.
Figure 1B:
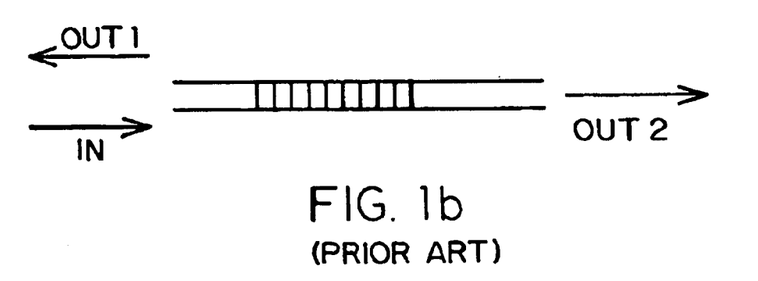
FIG. 1B depicts a fiber Bragg grating filter.
Figure 1C:
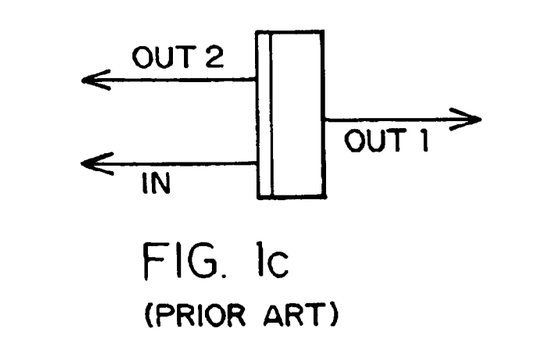
FIG. 1C represents a multi-layer interference filter.

Several multiplexing and de-multiplexing devices are essential to the operation of a DWDM system. FIG. 1A is a diagram illustrating the operation of a group of devices known as optical filters. An optical filter has the function of separating signals within a predetermined frequency window from the input spectrum. In a DWDM system, to de-multiplex composite data, an optical filter is employed to separate signals associated with a particular data channel as depicted in FIG. 1A. Because each channel requires a specific filter, a DWDM de-multiplexer will require n optical filters in cascade in order to separate all of n channels into separate outputs. Using these filter cascades in the reverse direction will enable the construction of a multiplexer where individual signal channels with different center wavelengths can be combined together to form a single composed optical output signal. There are several types of optical filters and brief descriptions are provided for two types of commonly available filters. In FIG. 1B, a filter made with optical fiber, known as fiber Bragg grating (FBG), is illustrated. In a FBG, the index of refraction of the optical fiber is periodically modified. The period of the modification, d, is related to the center wavelength $\lambda_m$ of the given filter as $\lambda_m = 2$ nd/m, where m is the order of the Bragg grating and n is average of the index of refraction of the fiber. Another type of filter frequently used in DWDM systems is a multi-layer interference filter. These filters are constructed with several, sometimes many layers of different optical materials with varying thickness such that a desired transmission (or reflection) curve centered near a predetermined channel center-frequency is obtained as depicted in FIG. 1C.

Figure 2A:
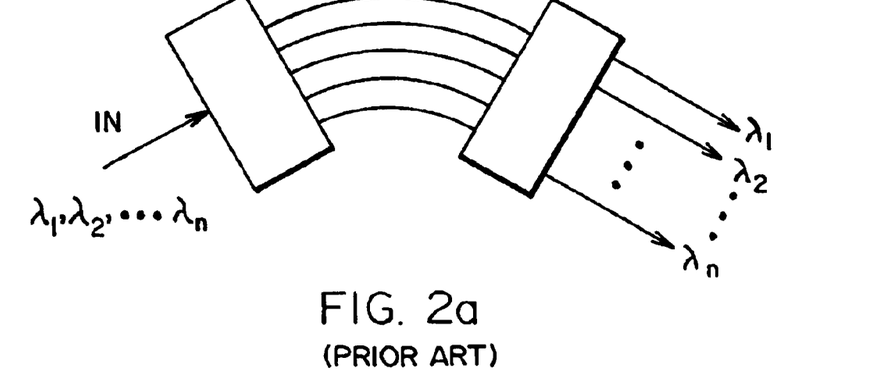
FIG. 2A is a diagram illustrating the operation of an arrayed waveguide grating (AWG) device.
Figure 2B:
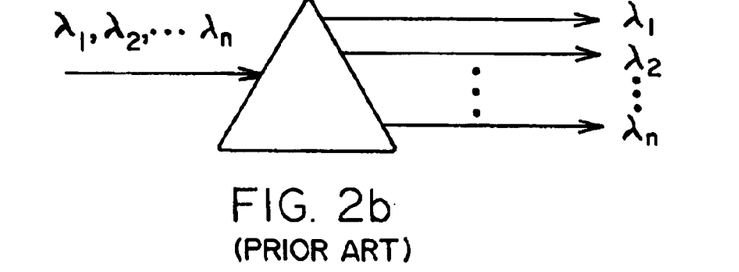
FIG. 2B represents a prism wavelength dispersion device.
Figure 2C:
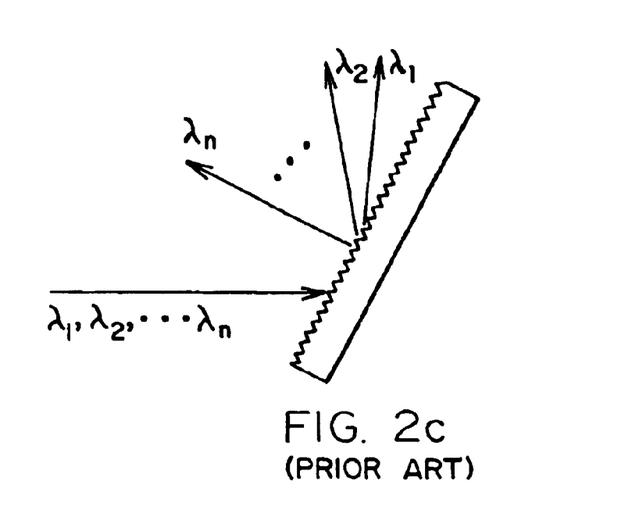
FIG. 2C shows the operation of a conventional grating device.

In the filter approach to DWDM, each data channel is associated with a specific optical filter. The DWDM system therefore consists of many filters, each of which has to be connected or placed in a particular location and/or orientation. A more systematic way to construct a DWDM system is to use wavelength dispersion devices such that many channels can be multiplexed or de-multiplexed with a single device. In FIG. 2A, a device commonly known as an arrayed waveguide grating (AWG) is displayed. As depicted, the AWG can be used to separate all data channels simultaneously. The output channels can be connected directly to individual optical fibers. When using an AWG in the reverse direction, many different signal channels can be combined into a single optical fiber. A prism can also be used to multiplex or de-multiplex optical signals. As displayed in FIG. 2B, due to dispersion, i.e., the index of refraction is different for different frequencies is so that the exit angle is different for channels having different center frequencies. Different output channels are separated in space and connected into individual fibers. Another commonly used device is a diffraction grating, an optical surface which is modified periodically (with a period d) such that when light is directed to this surface, the angle of incidence ($\alpha$) and diffraction ($\beta$) are related to the wavelength of the incoming light $\lambda$ according to: d (sin $\alpha$+sin $\beta$)=m $\lambda$, where m is an integer commonly referred to as the order of diffraction. Such a diffraction grating is illustrated in FIG. 2C.

Figure 3A:
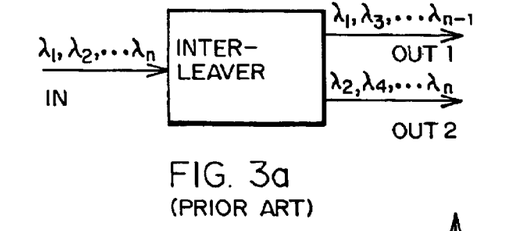
FIG. 3A is a block diagram illustrating the operation of an interleaver.
Figure 3B:
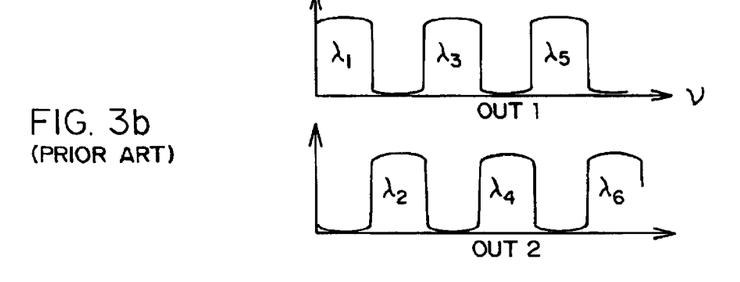
FIG. 3B displays the output frequency spectra associated with two output signals.
Figure 3C:
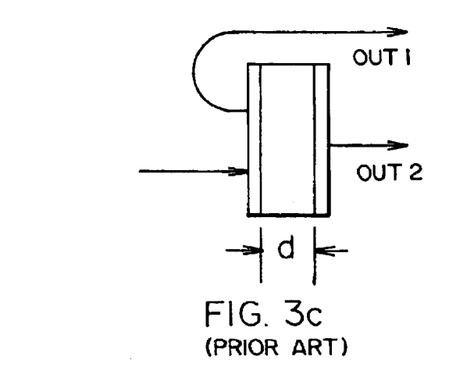
FIG. 3C shows an Fabry-Perot etalon interleaver and FIG. 3D depicts the operation of an interleaver based upon a Michelson interferometer.
Figure 3D:
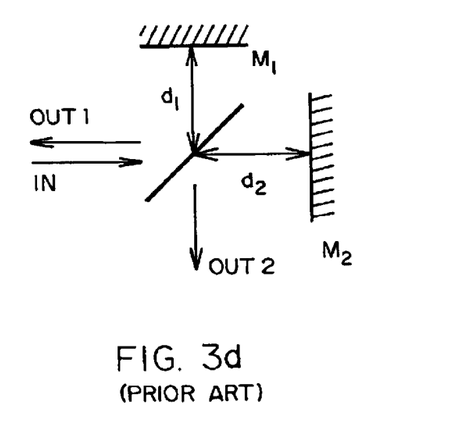

A third type of wavelength separating and combing devices is known as interleavers. FIG. 3A provides a function diagram of an interleaver. These interleavers separate a composite optical signal into two complementary signals in which the odd data channels are branched into one output and the even channels are directed into the other output. In an interleaver application, the frequency space is divided into two parts, 50% for output 1 and 50% for output 2, as illustrated in FIG. 3B. Two typical interleaver devices are depicted in FIG. 3C and FIG. 3D. In FIG. 3C, an interleaver designed based upon a Fabry-Perot etalon is displayed. In this device, two parallel, partially reflecting surfaces are separated by a distance d. The center wavelengths $\lambda_m$ associated with transmitted channels are given by $\lambda_m = 2$ nd/m, where m is an integer and n is the index of refraction. In FIG. 3D, an interleaver based on the Michelson interferometer is illustrated. The center wavelengths $\lambda_m$ associated with channels branched into OUTPUT 2 are given by $\lambda_m = 2$ n $(d_1 - d_2)$/m, where m is an integer and n is the index of refraction along the optical path. The performance and optical characteristics of these interleavers can be enhanced with certain modifications. For example, when a partial reflector is inserted into a Michelson interferometer based interleaver, parallel to one of the two mirrors, both the reflection and transmission spectra are significantly improved.

Figure 4:
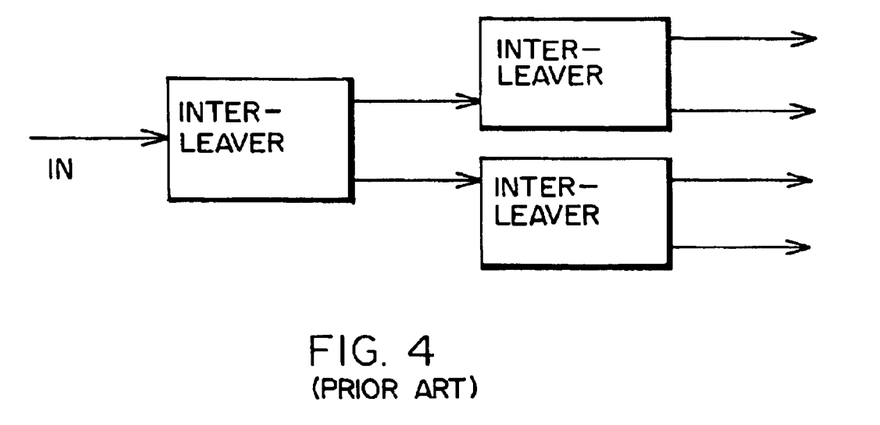
FIG. 4 (prior art) is a block diagram of three interleavers in a cascade. The four outputs each carries one quarter of the signal channels from the original composite input signal.
Figure 5:
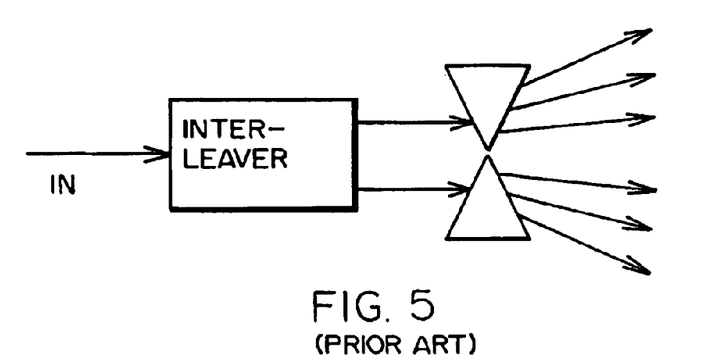
FIG. 5 (prior art) is a schematic diagram illustrating the combination of an interleaver and two multi-channel dispersion devices (prisms)
Figure 6:
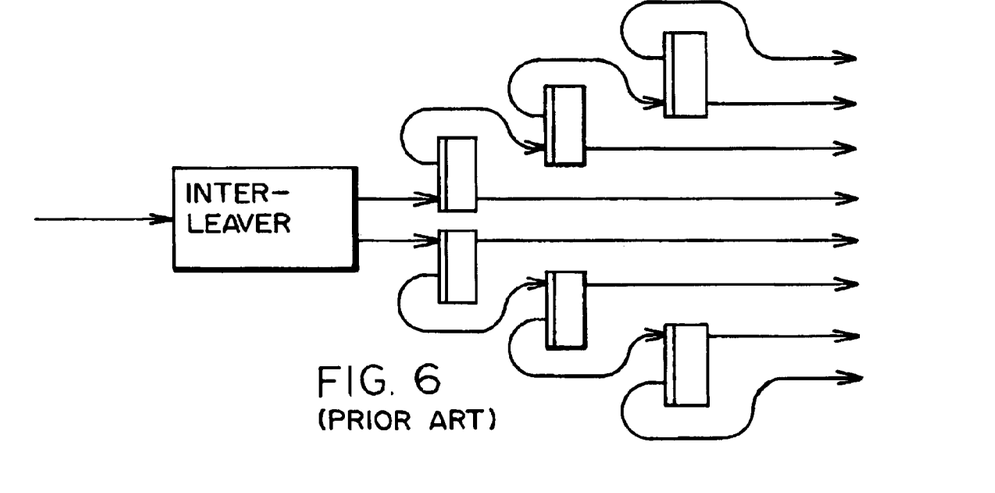
FIG. 6 (prior art) depicts a device composed of interleaver and filters. Each output of the device carries only one signal channel.

Interleavers provide more flexibility to DWDM system designers and engineers. In FIG. 4, two stages of interleavers are cascaded to provide four outputs each carrying one fourth of the original data channels. The frequency spacing of the adjacent data channels for a particular output is therefore four times the spacing between adjacent data channels in the input signal. Another practical configuration, as demonstrated in FIG. 5, utilizes both the interleaves and wavelength dispersion devices. In this configuration, the optical alignment and/or temperature stability requirements for the dispersion devices are significantly less stringent when the channel spacing is increased to twice the original spacing. In a different configuration as displayed in FIG. 6, an interleaver, or a two-stage cascade of interleavers, is followed by individual filters. In this configuration, filters with a larger channel spacing (e.g., 200 GHz filters) and hence lower tolerance and lower cost can be used to construct state of the art DWDM systems with smaller channel spacing (e.g., 100 GHz or 50 GHz). Therefore, interleavers provide an economical solution for system integrators.

SUMMARY OF THE INVENTION

In accordance with the present invention, an interleaver comprises a serial array of optical elements to which a multichannel, continuous spectrum, composite signal is input and two multichannel, non-continuous spectrum, composite signals are output. Two embodiments are disclosed One such embodiment provides output composite signals which are spectrally symmetric in that each such non-continuous spectrum contains the same number of channels albeit of alternating center wavelengths. The other such embodiment provides output composite signals which are spectrally asymmetric in that each such non-continuous spectrum contains either a different number of channels or an equal number of channels of narrower or wider passband.

Each of the preferred embodiments comprises optical elements which split the input composite signal into components of different polarization states, selectively add phase shifts to some of these components and then recombine them a number of times. These optical elements act on the light beams as they make a round trip through the interleavers; i.e., first one way and then the opposite way through the serial arrayed elements. In both of the disclosed embodiments of the invention, the input composite signal and the two output composite signals, are coupled to and exit from the interleaver at the same surface.

The inventive arrays operate on the incident composite signal light by exploiting the splitting, phase-shifting and re-combining of light beams to produce interference effects which attenuate the unwanted wavelength components in each composite output signal and reinforce the desired wavelength components.

BRIEF DESCRIPTION OF THE DRAWINGS

The aforementioned objects and advantages of the present invention, as well as additional objects and advantages thereof will be more fully understood hereinafter as a result of a detailed description of a preferred embodiment when taken in conjunction with the following drawings in which:

FIGS. 1A through 1C (prior art) are simplified diagrams illustrating conventional filters and their use in DWDM technology.

FIGS. 2A through 2C (prior art) are simplified diagrams illustrating conventional dispersion multi-channel devices and their use in DWDM technology.

FIGS. 3A through 3D (prior art) are simplified diagrams illustrating conventional interleaver devices and their use in DWDM technology.

DESCRIPTION OF THE PREFERRED EMBODIMENTS

Figure 7:
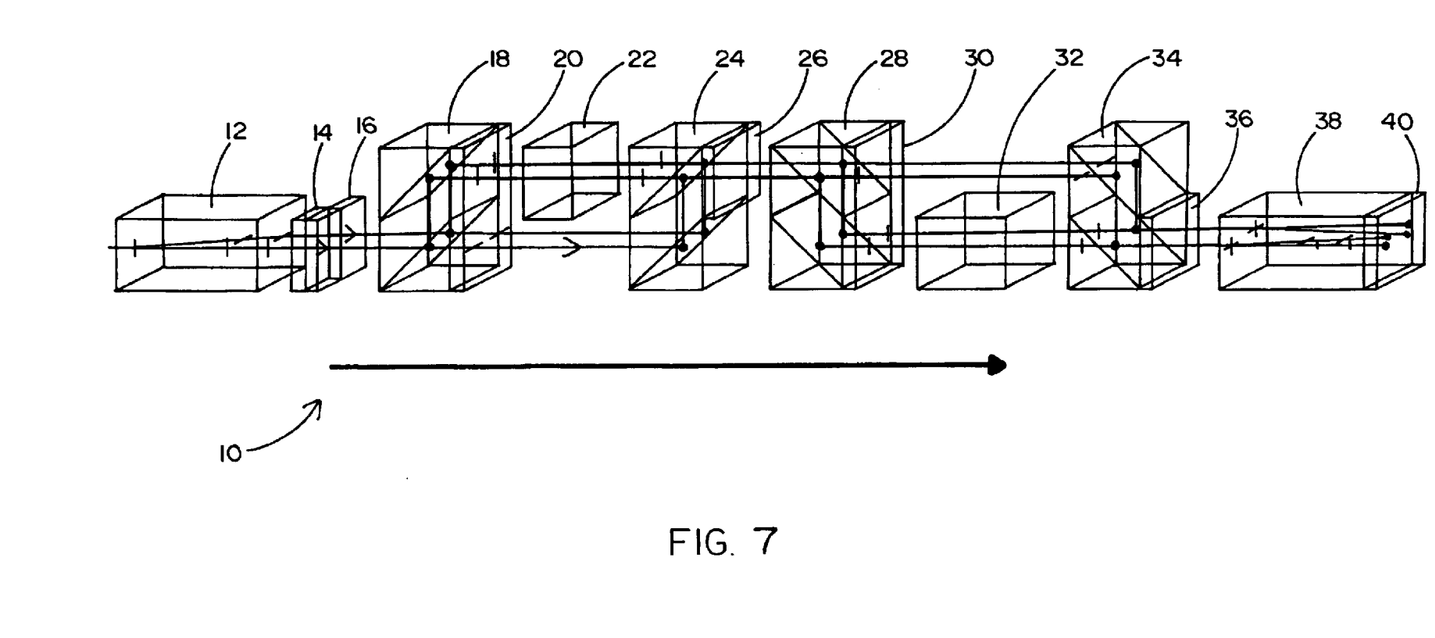
FIG. 7 is a partial beam tracing diagram of a symmetric interleaver in accordance with the first embodiment of the invention detailing the polarization state of light beam components traveling from left to right.
Figure 8:
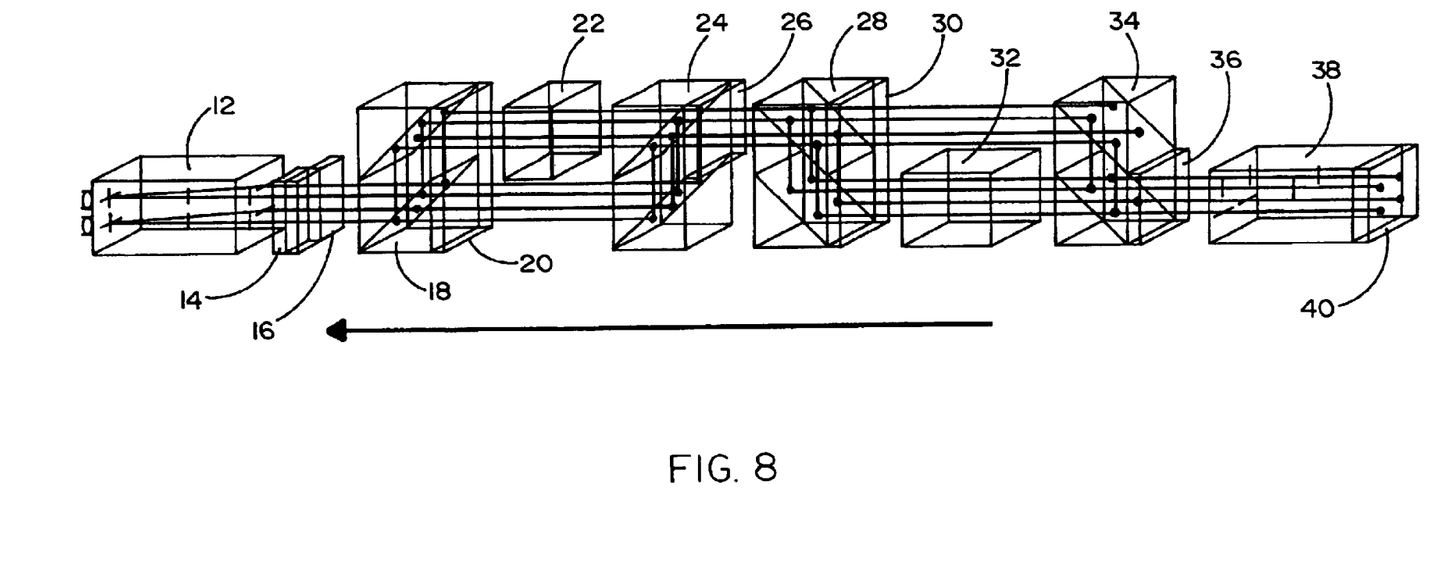
FIG. 8 is a partial beam tracing diagram similar to that of FIG. 7 but for light beam components traveling from right to left.

The fundamental design principle of present invention of interleavers is based upon the interference of multiple optical beams. Therefore, beam splitting elements, optical phase shifting components, optical beam combiners and beam processors are used as the building blocks of an interleaver. Two embodiments of the present invention of interleavers are disclosed, one for a symmetric interleaver, the other for an asymmetric interleaver Symmetric Interleaver FIGS. 7 and 8 schematically present the symmetric interleaver, according to a preferred embodiment of the present invention, wherein FIG. 7 shows beam traces of light traveling from left to right and FIG. 8 displays beam traces of light traveling from right to left. Referring now to FIG. 7, an optical input beam with a random polarization enters the interleaver from the left hand side. Item 12 is a beam displacer made of a birefringent crystal, which enables the separation of the two polarization components of the incident beam in the horizontal direction. Item 14 is an optical phase compensator that compensates for the phase difference between the beam displacer's ordinary and extraordinary rays. Item 16 is a polarization rotator, which rotates the beam polarization by 45 degrees. The modified beams then enter item 18, a polarization beam splitter. A half wave plate (HWP), item 20, placed immediately after item 18, rotates the polarization of each of the separated beams by 90 degrees. Item 20 is necessary for the beams to pass through the next stage of the interleaver properly. The polarizations of the top and bottom light beams following the exit of item 20 are clearly indicated in FIG. 7. Item 22 is a phase shifter, which creates a predetermined, relative phase difference between the top and bottom beams. The thickness of item 22 is determined based on the design requirement of the interleaver (e.g., 50 or 100 GHz channel spacing), as well as the index of refraction of the material used. Given the material, the thickness of item 22 may be readily determined by those of ordinary skill in the art. A polarization beam combiner, item 24, combines the phase-shifted (top) and the non-shifted (bottom) beams. As the beams exit item 24, the combined beam contains two components with relative phases of 0 and $\phi$, respectively. The relative phase shift $\phi$ depends upon the wavelength of the input light beam. Item 26 is a beam processor, made of a birefringent material. The orientation of its optical axis depends upon the specific interleaver design requirements. In the preferred embodiment of the present invention for a 100 GHz symmetric interleaver, the optical axis is oriented between 10 to 20 degrees. Item 26 modifies the phase and polarization state of the two components in the combined beam, changes the fractions of the two components having different relative phases when they are projected along the horizontal and vertical axes. Item 26 also allows the mixing of different polarization states to create multiple beam interference. The use of birefringent material in optical devices to manipulate the phase and polarization of light beam is well known to those of the ordinary skill in the art.

As indicated in FIG. 7, the passage of the light beams through the second stage of the interleaver, defined by items 28 through 36, further modifies their phases and polarization states in a similar manner as occurred in the first stage of the interleaver, defined by items 18 through 26.

Items 28 and 34 are respectively polarization beam splitter and combiner whose functions are similar to those of items 18 and 24, respectively. Likewise, items 32 and 36 are respectively phase shifter and beam processor whose functions resemble those of items 22 and 26, respectively. Item 30 is a half wave plate, identical to item 20. The phase shift induced by item 32, is twice as large as that induced by item 22. Therefore, beams passing through item 32 will acquire an additional phase shift of $2\phi$. The combined beam, at the entrance of the beam processor (item 36) will then have four phase components, with relative phases of 0, $\phi$, $2\phi$ and $3\phi$, respectively. As described previously for item 26, item 36 further modifies the relative fractions of the four phase components in such a way as to produce desirable spectral interference associated with a symmetric interleaver. In the preferred embodiment of the present invention, the orientation of the optical axis of item 36 is between 50 and 60 degrees.

The output from the second stage of the interleaver consists of two distinct light beams. Each light beam contains two different polarization components that can be further separated. One of the components contains only half of the input channels, whereas the other one contains complementary channels in the frequency domain.

The two outputs from item 36 can, in principle, be converted to the outputs of a symmetric interleaver. However, the isolation between adjacent channels may not be sufficient in demanding applications. The performance of the interleaver can be significantly enhanced when more stages are added. A preferred embodiment of the present invention utilizes the existing optical elements by directing the light beams back towards the original input. In this case, a beam displacer, item 38, separates each output of item 36 vertically into two individual beams of different polarizations. A quarter wave plate attached to a 100% reflector, item 40, reflects the traveling direction of the four beams by 180 degrees. The reflected beams then pass through item 38 once again, and their physical separations are enhanced.

In FIG. 8 the optical paths and polarization states for all four beams are clearly indicated. The principles behind the operation of the returning part of the interleaver as indicated in FIG. 8 are identical to those associated with FIG. 7 described earlier. The output signals are then collected through collimators into two optical fibers.

Figure 9:
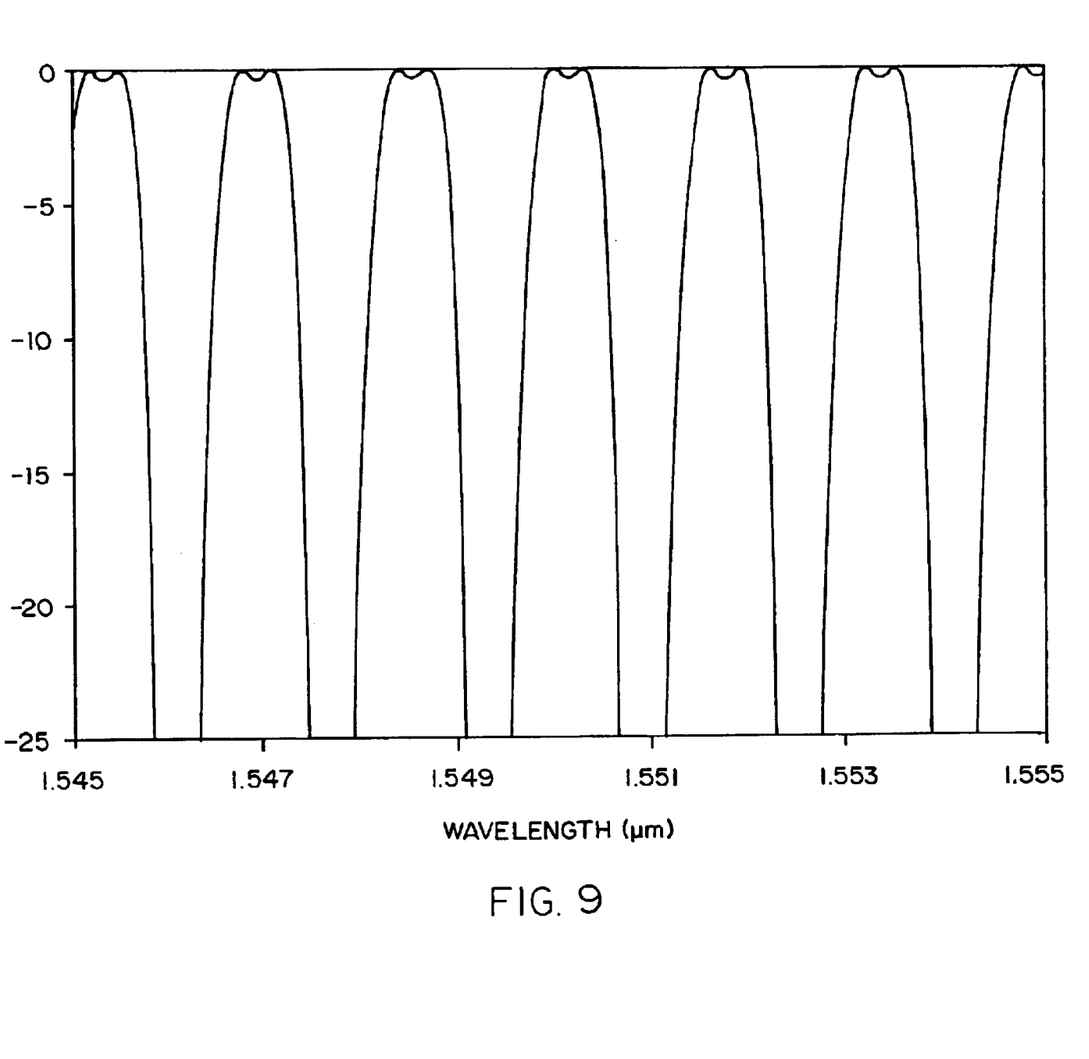
FIGS. 9 and 10 are calculated spectra illustrations of the respective outputs of the first embodiment of FIGS. 7 and 8.
Figure 10:
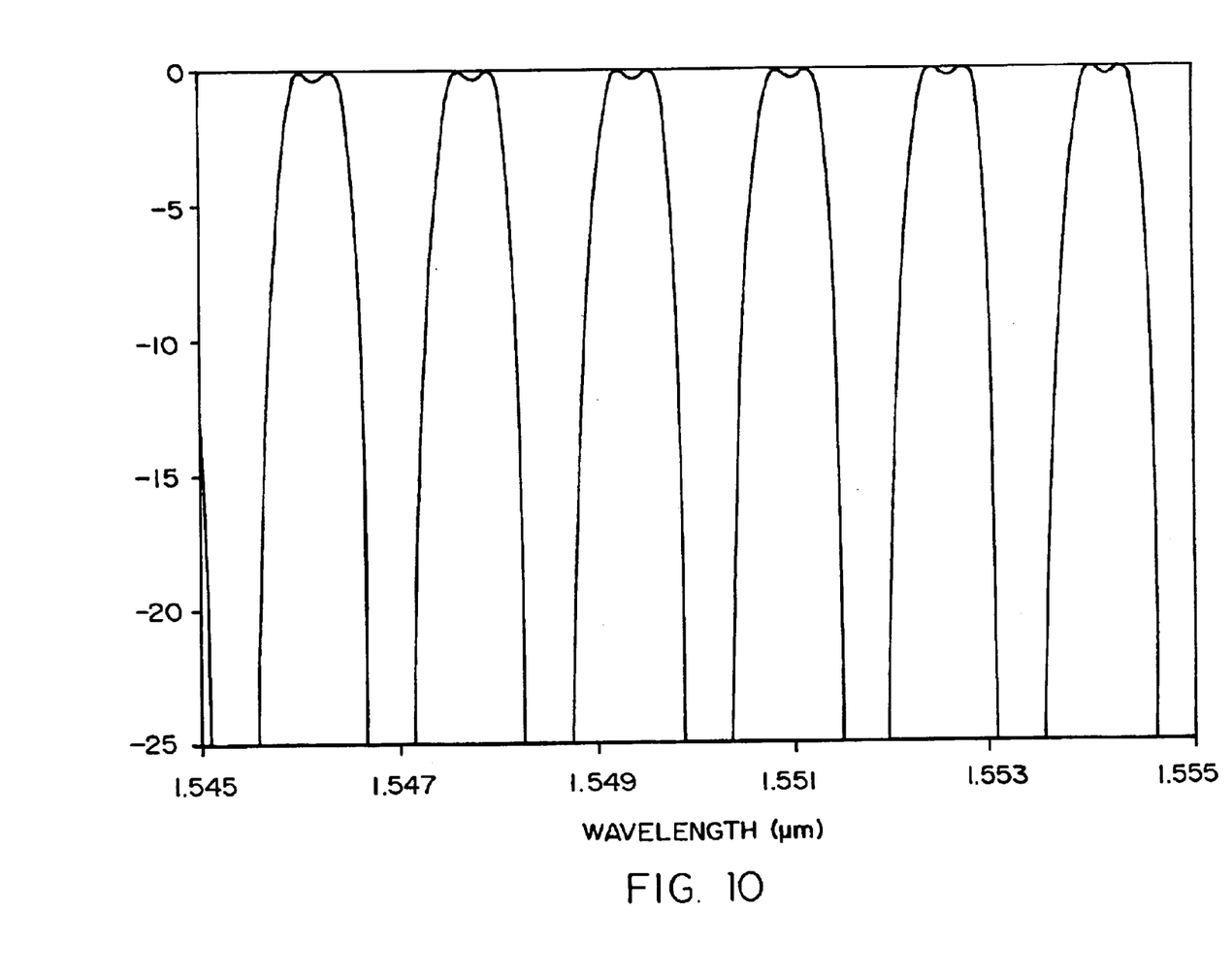

Referring now to FIGS. 9 and 10, the spectra associated with the two outputs of the interleaver according to a preferred embodiment of the present invention, designed for a 100 GHz channel separation, are displayed. As seen in these figures, one output is the symmetric complement of the other, and each output contains a series of alternately spaced wavelength channels of equal width and spacing as is typical of a symmetric interleaver.

Asymmetric Interleaver

An asymmetric interleaver, according to a preferred embodiment of the present invention, is designed following the same principles used in the symmetric interleaver.

Figure 11:
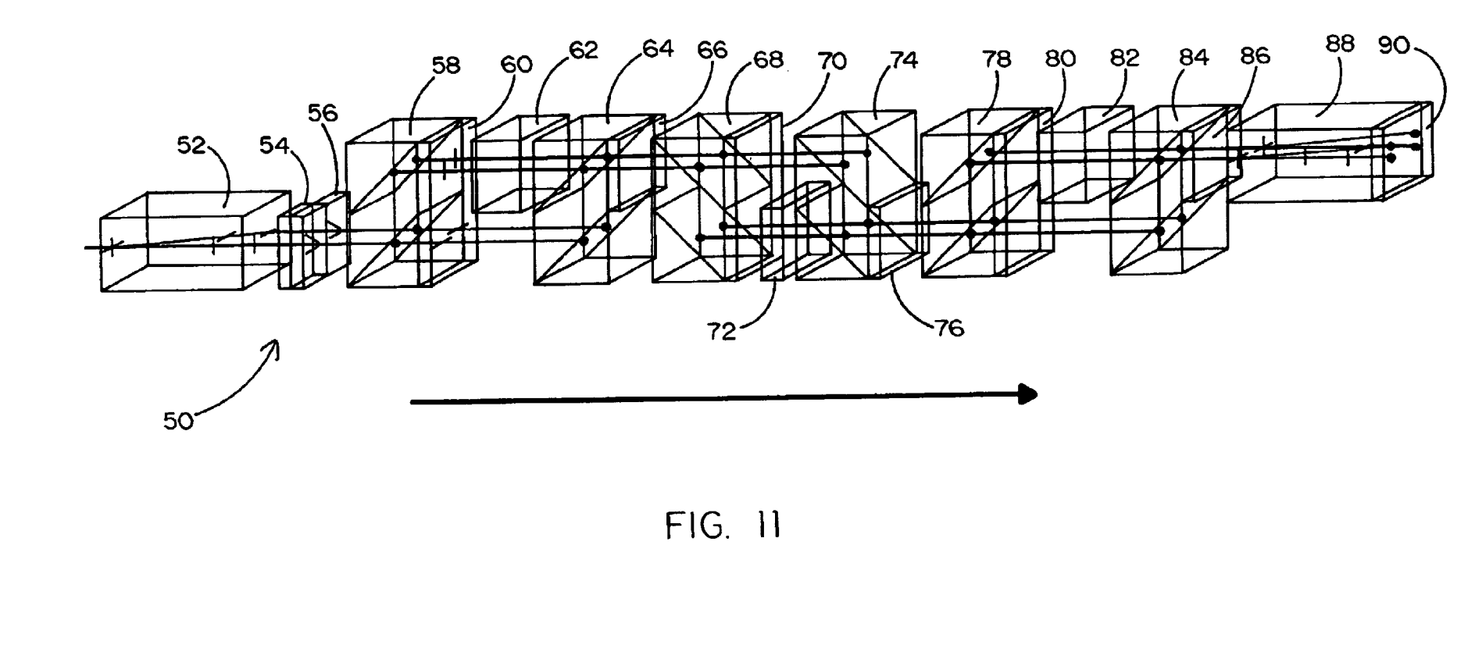
FIGS. 11 and 12 are beam tracing diagrams similar to FIGS. 7 and 8 but for an asymmetric interleaver in accordance with the second embodiment of the invention.
Figure 12:
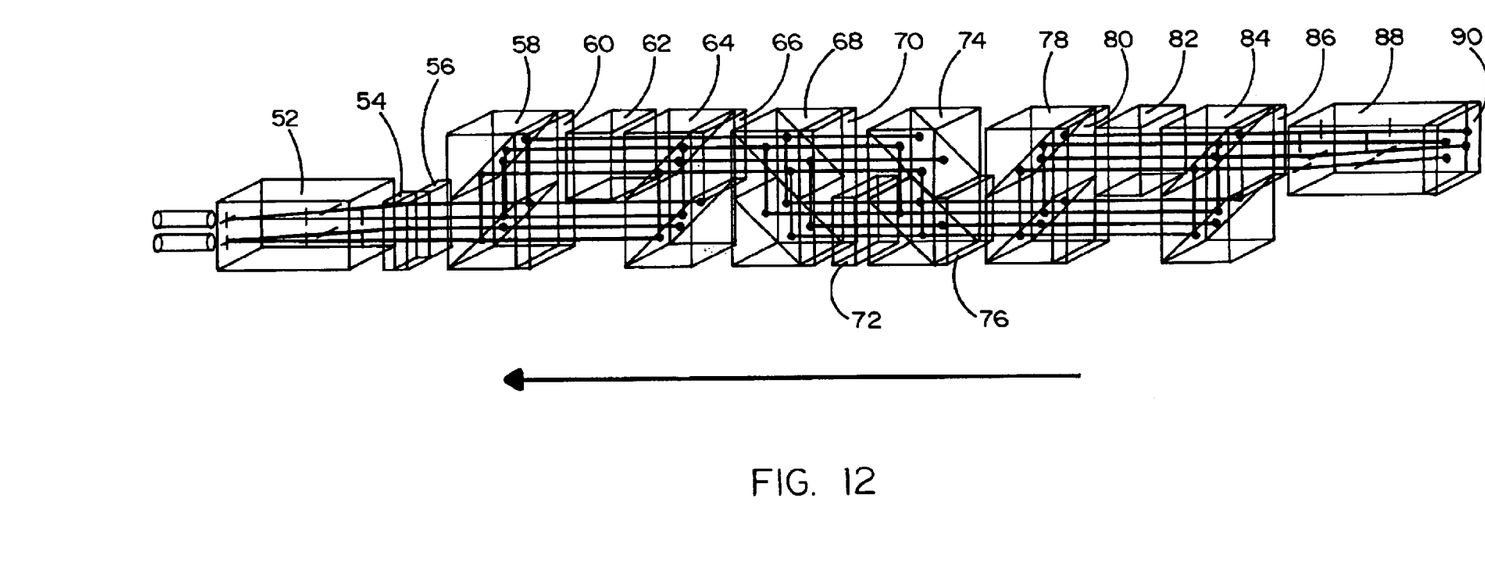

FIGS. 11 and 12 schematically outline the design of the asymmetric interleaver, in a similar fashion as FIGS. 7 and 8 do for the symmetric interleaver According to the second preferred embodiment of the present invention, FIG. 11 shows beam traces traveling from left to right and FIG. 12 from right to left. Referring now to FIG. 11, an input optical beam with a random polarization enters the interleaver from the left hand side. Item 52 is a beam displacer made of a birefringent crystal, which enables the separation of the two polarization components of the incident beam in the horizontal direction. Item 54 is an optical phase compensator that compensates for the phase difference between the beam displacer's ordinary and extraordinary rays. Item 56 is a polarization rotator which rotates the light beam polarization by 26 degrees. The modified beams then enter item 58, which is a polarization beam splitter. A half wave plate (HWP), item 60, placed immediately after item 58, rotates the polarization of each of the separated beams by 90 degrees. Item 60 is necessary for the beams to pass through the next stage of the interleaver properly. The polarizations of the top and bottom light beams following the exit of item 60 are clearly indicated in FIG. 11. Item 62, a phase shifter, creates a predetermined, relative phase difference between the top and bottom beams. The thickness of item 62 is determined based upon the design requirements of the asymmetric interleaver (e.g., 50 or 100 GHz channel spacing), as well as the index of refraction of the material used. Given the material, the thickness of item 62 may be readily determined by those of ordinary skill in the art. Item 64 is a polarization beam combiner which combines the phase-shifted (top) and non-shifted (bottom) beams. As the beams exit item 64, the combined beam contains two components with relative phases of 0 and $2\phi$, respectively. The relative phase shift $2\phi$ depends upon the wavelength of the input light beam. Item 66 is a beam processor, made of a birefringent material. The orientation of its optical axis depends upon the specific interleaver design requirements. In the preferred embodiment of the present invention for an asymmetric interleaver with 75 GHz channel spacing, the optical axis is oriented between 0 to 10 degrees. Item 66 modifies the phase and polarization state of the two components in the combined beams, changes the fractions of the two components having different relative phases when they are projected along the horizontal and vertical axes, as previously described. Item 66 also allows the mixing of different polarization states to create multiple beam interference. The use of birefringent material in optical devices to manipulate the phase and polarization is well known to those of the ordinary skill in the art.

As indicated in FIG. 11, the passage of the light beams through the second stage of the asymmetric interleaver, defined by items 68 through 76, further modifies their phases and polarization states in a similar manner as occurred in the first stage of the interleaver, defined by items 58 through 66.

Items 68 and 74 are respectively polarization beam splitter and combiner whose functions are similar to those of items 58 and 64, respectively. Likewise, items 72 and 76 are respectively phase shifter and beam processor whose functions resemble those of items 62 and 66, respectively. Item 70 is a half wave plate, identical to item 60. The phase shift induced by item 72, is half of that of item 62. Therefore, beams passing through item 72 will acquire an additional relative phase shift of $\phi$. The combined beam, at the entrance of the beam processor (item 76) will have four phase components, with relative phases of 0, $\phi$, $2\phi$ and $3\phi$, respectively. As described previously for item 66, item 76 further modifies the relative fractions of the four phase components. In the preferred embodiment of the present invention for an asymmetric interleaver with 75 GHz channel spacing, the optical axis is oriented between 50 to 60 degrees.

As indicated in FIG. 11, after passing through the first two stages of the asymmetric interleaver, the light beams enter the third stage of the asymmetric interleaver, defined by items 78 through 86. The third stage further modifies the phases and polarization states of the light beams in a similar manner as occurred in the first and second stages of the interleaver.

The optical components, their alignments and orientations in the third stage of the asymmetric interleaver can be identical to those of the first stage. For example item 78 can be interchanged with item 58 without compromising the performance of the interleaver.

Items 78 and 84 are respectively polarization beam splitter and combiner whose functions are similar to those of items 58 and 64, respectively. Likewise, items 82 and 86 are respectively phase shifter and beam processor whose functions resemble those of items 62 and 66, respectively. Item 80 is a half wave plate, identical to item 60. The phase shift induced by item 82 can be the same as that for item 62. Therefore, beams passing through item 82 will acquire an additional phase shift of $2\phi$. The combined beam, at the entrance of the beam processor (item 86) will have eight phase components, with relative phases of 0, $\phi$, $2\phi$, $3\phi$, $2\phi$, $3\phi$, $4\phi$ and $5\phi$, respectively. As described previously for item 66, item 86 further modifies the relative fractions of the eight phase components in such a way as to produce desirable spectral interference associated with an asymmetric interleaver. In the preferred embodiment of the present invention for an asymmetric interleaver with 75 GHz channel spacing, the optical axis is oriented between 0 to 10 degrees.

The output from the third stage of the interleaver consists of two distinct light beams. Each light beam contains two different polarization components that can be further separated. One of the components contains only half of the input channels, whereas the other one contains complementary channels in the frequency domain, governed by the fundamental laws of physics and the design requirements of the asymmetric interleaver.

The two outputs from item 86 may, in principle, be converted to the outputs of an asymmetric interleaver. However, the isolation between adjacent channels may not be sufficient in demanding applications. The performance of the interleaver can be substantially enhanced when more stages are added. A preferred embodiment of the present invention utilizes the existing optical elements by directing the light beams back towards the original input. In this case, a beam displacer, item 88, separates each output of item 86 vertically into two individual beams of different polarizations. A quarter wave plate attached to a 100% reflector, item 90, reflects the traveling direction of the four beams by 180 degrees. The reflected beams pass through item 88 once again, and their physical separations are enhanced.

In FIG. 12 the optical paths and polarization states for all four beams are clearly indicated. The principles behind the operation of the returning part of the interleaver as indicated in FIG. 12 are identical to those associated with FIG. 11, as described in the previous section. The output signals are collected through collimators into two optical fibers.

Figure 13:
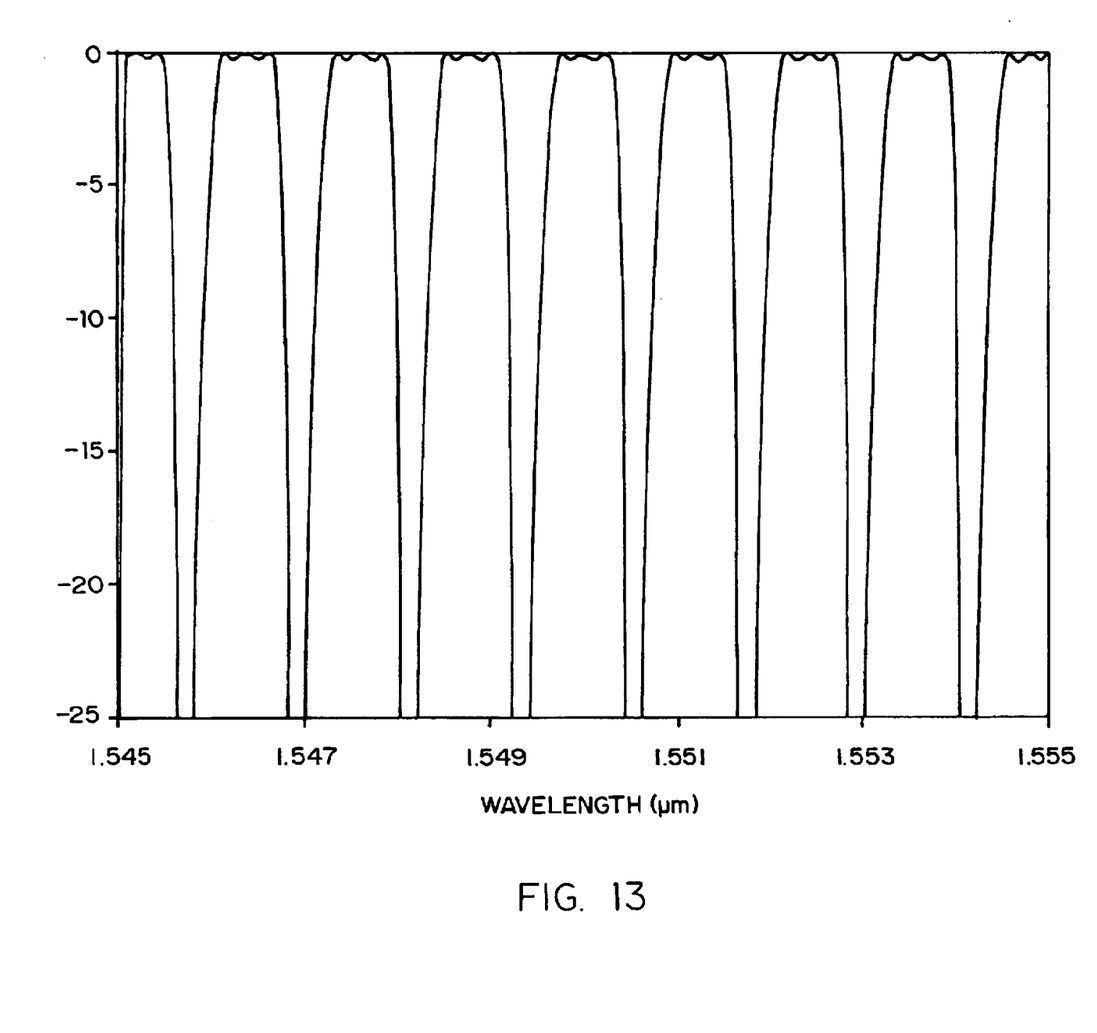
FIGS. 13 and 14 are calculated spectra illustrations similar to those of FIGS. 9 and 10 but for the second embodiment of FIGS. 11 and 12.
Figure 14:
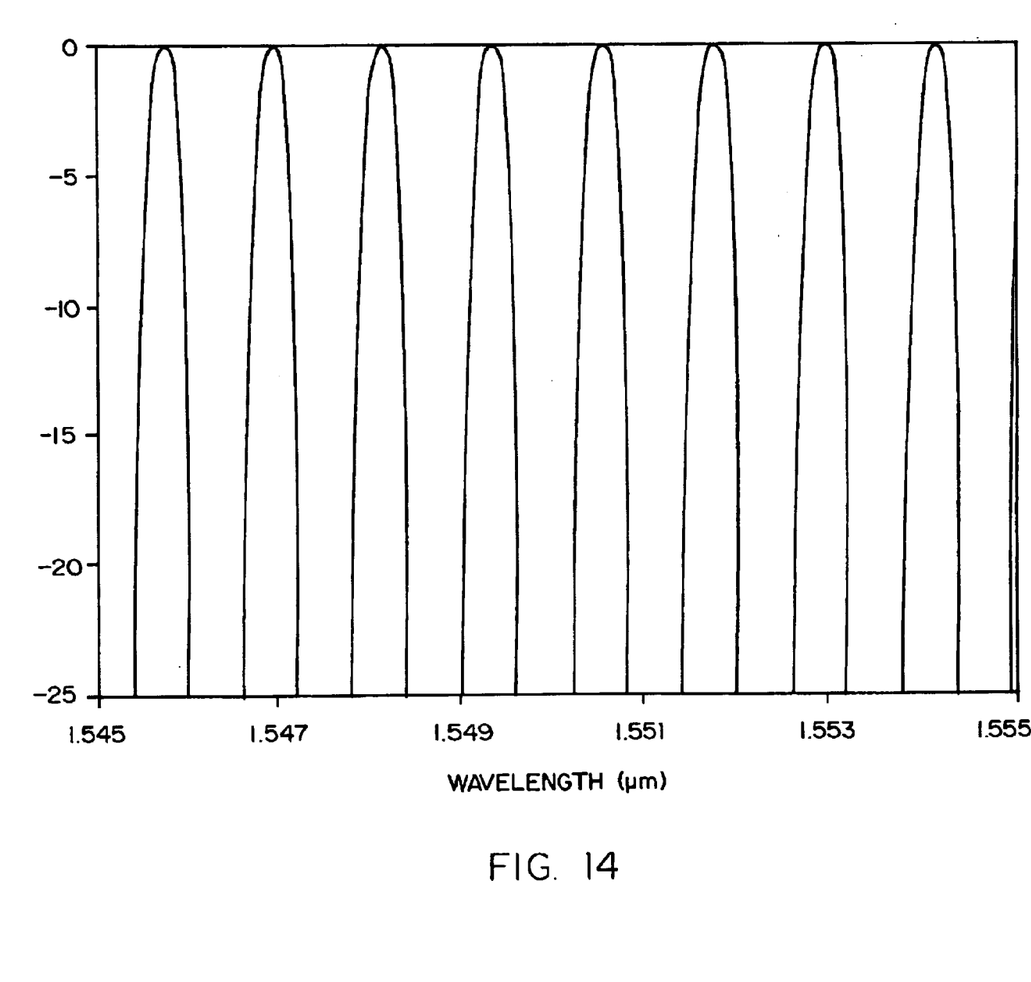

Referring now to FIGS. 13 and 14, the spectra associated with the two outputs of the asymmetric interleaver designed for a 75 GHz channel separation, according to a preferred embodiment of the present invention, are displayed. As seen in these figures, one output is the asymmetric complement of the other, and each output contains a series of alternately spaced wavelength pass-bands of different widths as is typical of an asymmetric interleaver.

It should be noted that in the preferred embodiments of the present invention disclosed herein, although specific design parameters and optical elements are detailed, there are other combinations of design parameters as well as other optical elements that could be used in the construction of a similar optical interleaver by those of the ordinary skill in the art. Thus, the disclosed embodiments are intended to be merely illustrative and not limiting of the invention. While the disclosure herein is intended to fully convey the concepts and principles of the invention and to enable any person of ordinary skill in the relevant arts to make and use the invention without undue experimentation, it will be understood that numerous modifications may be made without departing from the spirit and scope of the present invention hereof which is to be limited only by the appended claims and their equivalents.

We claim:

1. An optical signal interleaver for receiving an optical composite signal input having a continuous spectrum of multiple channels each having a center wavelength and generating a pair of optical composite signal outputs each having a non-continuous spectrum of multiple channels having respective center wavelength;

the interleaver comprising:
a serial array of optical components through which beams of optical signals may pass first in one direction and then be reflected to pass in the opposite direction;
said optical components having at least one polarization beam splitter, configured for splitting said beams into a greater number of beams based upon respective polarizations of said beams, at least one beam combiner, configured for recombining said split beams into a smaller number of beams based upon respective polarizations of said beams;
at least one phase shifter placed between said at least one beam splitter and said at least one beam combiner for shifting the phase of some selected said split beams before they are recombined with split beams without phase shift;
at least one beam processor to adjust the fraction of the light beam components with different relative phase shift to achieve a spectral interference pattern such that unwanted center wavelength channels are attenuated while desired center wavelength channels are reinforced.

2. The interleaver recited in claim 1 wherein said at least one splitter, phase shifter, combiner, and processor are selected to provide said pair of outputs with symmetric spectra.

3. The interleaver recited in claim 1 wherein said at least one splitter, phase shifter, combiner, and processor are selected to provide said pair of outputs with asymmetric spectra.

* * * * *